(12) United States Patent
Castor

(10) Patent No.: US 10,819,147 B2
(45) Date of Patent: Oct. 27, 2020

(54) AIR TO ELECTRICAL ENERGY AND WATER MICROGRID

(71) Applicant: Varnell M. Castor, Chelsea, MA (US)

(72) Inventor: Varnell M. Castor, Chelsea, MA (US)

(*) Notice: Subject to any disclaimer, the term of this patent is extended or adjusted under 35 U.S.C. 154(b) by 230 days.

(21) Appl. No.: 16/059,239

(22) Filed: Aug. 9, 2018

(65) Prior Publication Data

US 2018/0366980 A1 Dec. 20, 2018

Related U.S. Application Data

(63) Continuation-in-part of application No. 15/330,435, filed on Sep. 21, 2016, now abandoned, which is a
(Continued)

(51) Int. Cl.
| | | |
|---|---|---|
| H02J 15/00 | (2006.01) | |
| H02J 7/02 | (2016.01) | |
| H02N 2/02 | (2006.01) | |
| H02J 3/38 | (2006.01) | |
| B01D 24/10 | (2006.01) | |
| F01B 1/00 | (2006.01) | |
| F01B 23/10 | (2006.01) | |
| B01D 24/00 | (2006.01) | |

(Continued)

(52) U.S. Cl.
CPC .......... *H02J 15/006* (2013.01); *B01D 24/007* (2013.01); *B01D 24/105* (2013.01); *F01B 1/00* (2013.01); *F01B 11/004* (2013.01); *F01B 11/02* (2013.01); *F01B 23/10* (2013.01); *H02J 3/38* (2013.01); *H02J 3/382* (2013.01); *H02J 7/0068* (2013.01); *H02J 7/025* (2013.01); *H02N 2/02* (2013.01); *H02N 2/18* (2013.01); *F02B 63/041* (2013.01); *Y02E 60/15* (2013.01); *Y02E 70/30* (2013.01)

(58) Field of Classification Search
None
See application file for complete search history.

(56) References Cited

U.S. PATENT DOCUMENTS

2006/0283350 A1* 12/2006 Kumar ................... B60L 50/61
105/26.05
2010/0133903 A1* 6/2010 Rufer ....................... H02J 7/35
307/22

(Continued)

*Primary Examiner* — Alfonso Perez Borroto
*Assistant Examiner* — Esayas G Yeshaw
(74) *Attorney, Agent, or Firm* — Shawn Gordon, Esq.; Dunkiel Saunders Elliott Raubvogel & Hand, PLLC

(57) ABSTRACT

A combined heat and power microgrid system is provided that stores energy in the form of compressed air that can then be utilized as needed in the form of electricity. The compressed air may be generated with energy from multiple electrical energy sources, such as renewable energy sources. The energy stored as compressed air/heat is used to charge a battery by utilizing a pulley system and a barrel housing that transfers kinetic energy generated by the release of the compressed air to an array of piezoelectric generators that can produce electricity, which is stored in the second battery. In addition, water may be extracted from the compressed air storage tank. In this way, energy produced by the renewable sources can be accessed during periods of high need or low production and water may be collected.

20 Claims, 13 Drawing Sheets

Related U.S. Application Data continuation-in-part of application No. 14/645,013, filed on Mar. 11, 2015, now abandoned.

(60) Provisional application No. 61/950,889, filed on Mar. 11, 2014.

(51) Int. Cl.
| | | |
|---|---|---|
| *H02J 7/00* | (2006.01) | |
| *F01B 11/02* | (2006.01) | |
| *F01B 11/00* | (2006.01) | |
| *H02N 2/18* | (2006.01) | |
| *F02B 63/04* | (2006.01) | |

(56) References Cited

U.S. PATENT DOCUMENTS

2010/0326075 A1* 12/2010 Fong ................ F01B 17/022
          60/650
2011/0296823 A1* 12/2011 McBride ................ F02G 1/02
          60/407

\* cited by examiner

AIR TO ELECTRICAL ENERGY AND WATER MICROGRID

RELATED APPLICATION DATA

This application is a continuation-in-part of U.S. application Ser. No. 15/330,435, filed Sep. 21, 2016, and entitled "Combined Renewable Energy and Compressed Gas Energy Storage and Generator Microgrid System Using Reciprocating Piezoelectric Generators," which is a continuation-in-part of U.S. application Ser. No. 14/645,013, filed Mar. 11, 2015, and entitled "Rail Barrel Direct Energy Transferor Piezoelectricity (RBDETP)," and claims priority to U.S. Provisional Patent App. No. 61/950,889, filed Mar. 11, 2014, and entitled "Rail Barrel Direct Energy Transferor Piezoelectricity (RBDETP)," each of which is hereby incorporated by reference herein in their entirety.

FIELD OF THE INVENTION

The present invention generally relates to pressure-conversion, thermal energy generator, and storage systems. In particular, the present invention is directed to a combined renewable energy, batteries and compressed gas energy storage and generator microgrid system that utilizes reciprocating piezoelectric generators and a pulley system, and that functions as a rapid charge application, an onsite uninterruptible power supply, and water harvester.

BACKGROUND

An ongoing shortcoming of many renewable energy sources is the inconsistent production of energy (e.g., solar power at night or wind power when it is calm). The ability to efficiently store energy generated by renewable sources for later use (e.g., during peak demand or when energy production is limited) is important. There have been many storage techniques proposed, but there remains a need for a clean, sustainable, reliable, portable energy storage system that stores a high density of energy and produces water.

SUMMARY OF THE DISCLOSURE

A system for storing energy is provided that includes a first battery coupled to one or more energy sources, a gas compressor connected to the first battery and a gas storage chamber, wherein the gas compressor inputs compressed air into the gas storage chamber, and a plurality of hoses connected to the gas storage chamber. A housing having an inner section, a first outer section, and a second outer section is connected to the plurality of hoses and includes a first pneumatic piston within the housing and a second pneumatic piston within the housing. Opposing the first piston, a first drive bar is connected to the first piston, a second drive bar is connected to the second piston, and a plurality of linear generators are configured such that motion of the first piston and the second piston will cause the respective first drive bar and second drive bar to move along at least some of the plurality of linear generators, and wherein the first drive bar has a first end and a second end and the second drive bar has a third end and a fourth end. In addition, a pulley system is included that has a first pulley wheel with a first pulley cord, the first cord having a first end and a second end, wherein the first end is attached to the first end of the first drive bar and the second end is attached to the fourth end of the second drive bar, and includes a second pulley wheel with a second pulley cord, the second pulley cord having a third end and a fourth end, wherein the third end is attached to the first end of the first drive bar and the fourth end is attached to the fourth end of the second drive bar. A second battery is included wherein when the compressed air from the gas storage chamber is released into the inner section of the housing, the first piston and the second piston are propelled outwardly, thereby displacing the first drive bar and the second drive bar along at least some of the plurality of linear generators to produce electrical energy and when the compressed air from the gas storage chamber is released into the first outer section and the second outer section of the housing, the first piston and the second piston move inwardly, thereby displacing the first drive bar and the second drive bar along at least some of the plurality of linear generators to produce electrical energy that is stored in a second battery, wherein the second battery can be or is connected to first battery, and wherein the pulley system is configured to reduce an amount of compressed air required to propel the first piston and second piston outwardly and required to propel the first piston and the second piston inwardly.

It is another objective of the invention to provide a portable pressure conversion generator and storage system for storing energy generated by renewable energy sources that includes a gas compressor, a gas storage chamber configured to received and store compressed air from the gas compressor, and a plurality of hoses connected to the gas storage chamber. A housing is included having an inner section, a first outer section, and a second outer section, the housing being connected to the plurality of hoses and including a first pneumatic piston within the housing and a second pneumatic piston within the housing and opposing the first piston, a first drive bar connected to the first piston, a second drive bar connected to the second piston, and a plurality of linear generators configured such that motion of the first piston and the second piston will cause the respective first drive bar and second drive bar to move along at least some of the plurality of linear generators, and wherein the first drive bar has a first end and a second end and the second drive bar has a third end and a fourth end. A pulley system is included that has a first pulley wheel with a first pulley cord, the first cord having a first end and a second end, wherein the first end is attached to the first end of the first drive bar and the second end is attached to the fourth end of the second drive bar, and has a second pulley wheel with a second pulley cord, the second pulley cord having a third end and a fourth end, wherein the third end is attached to the first end of the first drive bar and the fourth end is attached to the fourth end of the second drive bar. When the compressed air from the gas storage chamber is released into the inner section of the housing, the first piston and the second piston are propelled outwardly, thereby displacing the first drive bar and the second drive bar along at least some of the plurality of linear generators to produce electrical energy and when the compressed air from the gas storage chamber is released into the first outer section and the second outer section of the housing, the first piston and the second piston move inwardly, thereby displacing the first drive bar and the second drive bar along at least some of the plurality of linear generators to produce electrical energy, and wherein the pulley system is configured to reduce an amount of compressed air required to propel the first piston and second piston outwardly and required to propel the first piston and second piston inwardly.

It is another objective to provide a portable pressure conversion generator and storage system for storing energy generated by renewable energy sources that includes a gas compressor, a gas storage chamber configured to received and store compressed air from the gas compressor, and a plurality of hoses connected to the gas storage chamber. A housing is included that has an inner section, a first outer section, and a second outer section, the housing being connected to the plurality of hoses and including a first pneumatic piston within the housing and a second pneumatic piston within the housing and opposing the first piston, a first drive bar connected to the first piston, a second drive bar connected to the second piston, and a plurality of linear generators configured such that motion of the first piston and the second piston will cause the respective first drive bar and second drive bar to move along at least some of the plurality of linear generators. When the compressed air from the gas storage chamber is released into the inner section of the housing, the first piston and the second piston are propelled outwardly, thereby displacing the first drive bar and the second drive bar along at least some of the plurality of linear generators to produce electrical energy and when the compressed air from the gas storage chamber is released into the first outer section and the second outer section of the housing, the first piston and the second piston move inwardly, thereby displacing the first drive bar and the second drive bar along at least some of the plurality of linear generators to produce electrical energy.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A microgrid is provided that stores energy in the form of compressed air that can be converted to electricity when needed and that can also produce potable water. The present invention is a dual mode resource extraction system that uses compressed air to store energy from renewable energy sources that can then be used to generate electricity and to extract airborne moisture for storable hydration purposes. This microgrid system can be used, for example, as a reliable electricity source in areas with an unreliable electrical grid, and it can provide water when there is a shortage of potable water during an emergency.

The present invention provides a portable isothermal compressed gas energy storage and generation system that works in conjunction with a plurality of reciprocating generators and renewable energy input sources to store electrical energy in a relatively high density. A high ratio of gas as compressed heat is stored and recycled throughout the system, which can alleviate energy storage issues and conserve energy for longer periods.

As described in more detail below, a pulley system may also be incorporated into the microgrid system that reduces by half or more the volume of compressed gas required to displace the centered double-sided, dual-acting pneumatic piston drive system that activates generators each cycle. The inclusion of a pulley system also facilitates the repetitive aligning of distal end sleeve assemblies behind existing rows of generators to enable the pneumatic-induced kinetic force applicator to simultaneously activate an array of generators each cycle.

Figure 1:
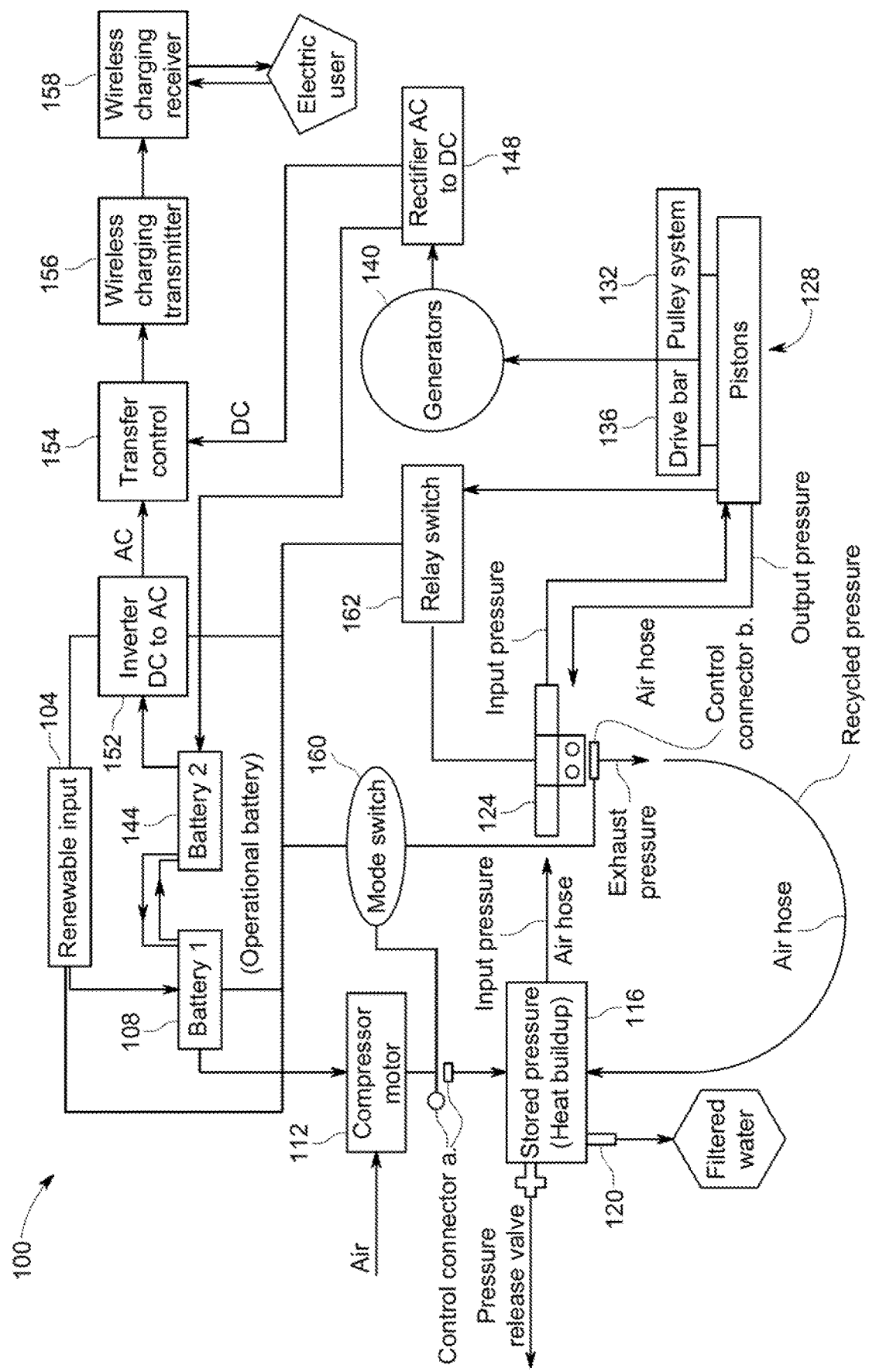
FIG. 1 is a schematic diagram showing an overview of components of an energy storage system in accordance with an embodiment of the present invention.

At a high level, and as outlined in FIG. 1, a combined renewable energy and compressed gas energy storage and generation microgrid system 100 includes at least one energy source 104, which is preferably a renewable energy source, a first battery 108, a compressor motor 112, a gas storage tank 116, a water collection and filtration system 120, a relay 124, a piston system 128, a pulley system 132, a drive bar system 136, motion-to-electrical generators 140, a second battery 144, a rectifier 148, and an inverter 152. Other components may include a transfer control 154, a wireless charging transmitter 156, a wireless charging receiver 158, a mode switch 160, and a relay switch 162.

Energy sources 104 may include renewable energy sources such as solar, wind, or hydroelectric, or other sources of electrical energy. This energy, when available, is directed into first battery 108, which is used to power compressor motor 112. Compressor motor 112 compresses a gas, preferably ambient air, that is stored when compressed in gas storage tank 116. Compressed air in tank 116 is released via relay 124 into piston system 128 and the energy stored in the form of compressed air is converted into the motion of pistons, which are connected to a drive bar system 136. Drive bar system 136 engages with generators 140 to convert translational motion into electrical energy, which is then transferred and stored in second battery 144. The stored electrical energy in second battery 144 can be used as a source of energy for end users or when not in demand to charge first battery 108. These conversions are carried out using rectifier 148 and/or inverter 152. In addition, pulley system 132 may be integrated with piston system 128 to reduce the amount of compressed air required to drive the pistons. Further, water filtration system 120 may be used to extract, collect, and filter water that condenses from the compressed air.

Figure 2A:
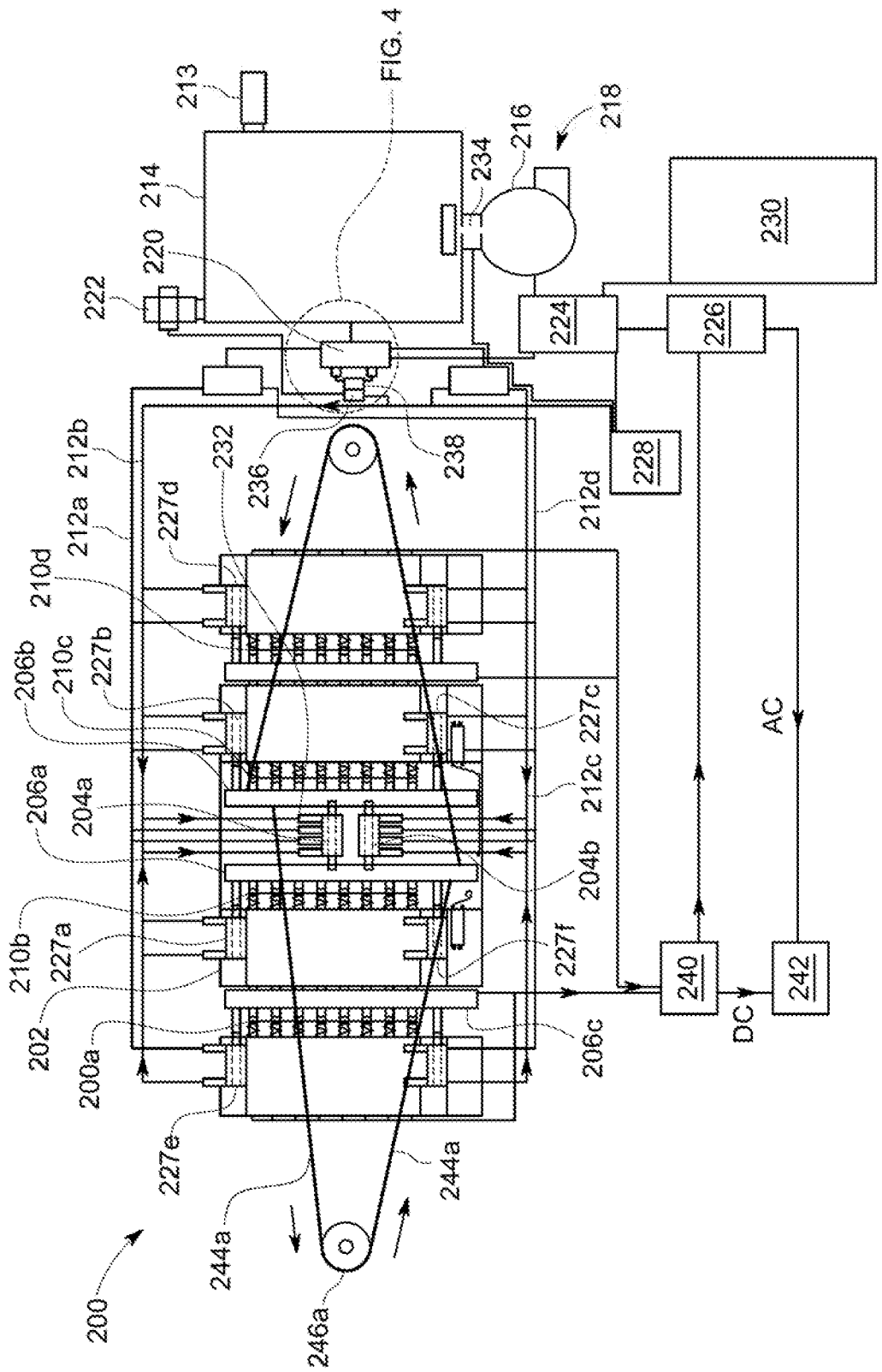
FIG. 2A depicts components of an energy storage system in accordance with an embodiment of the present invention.
Figure 2B:
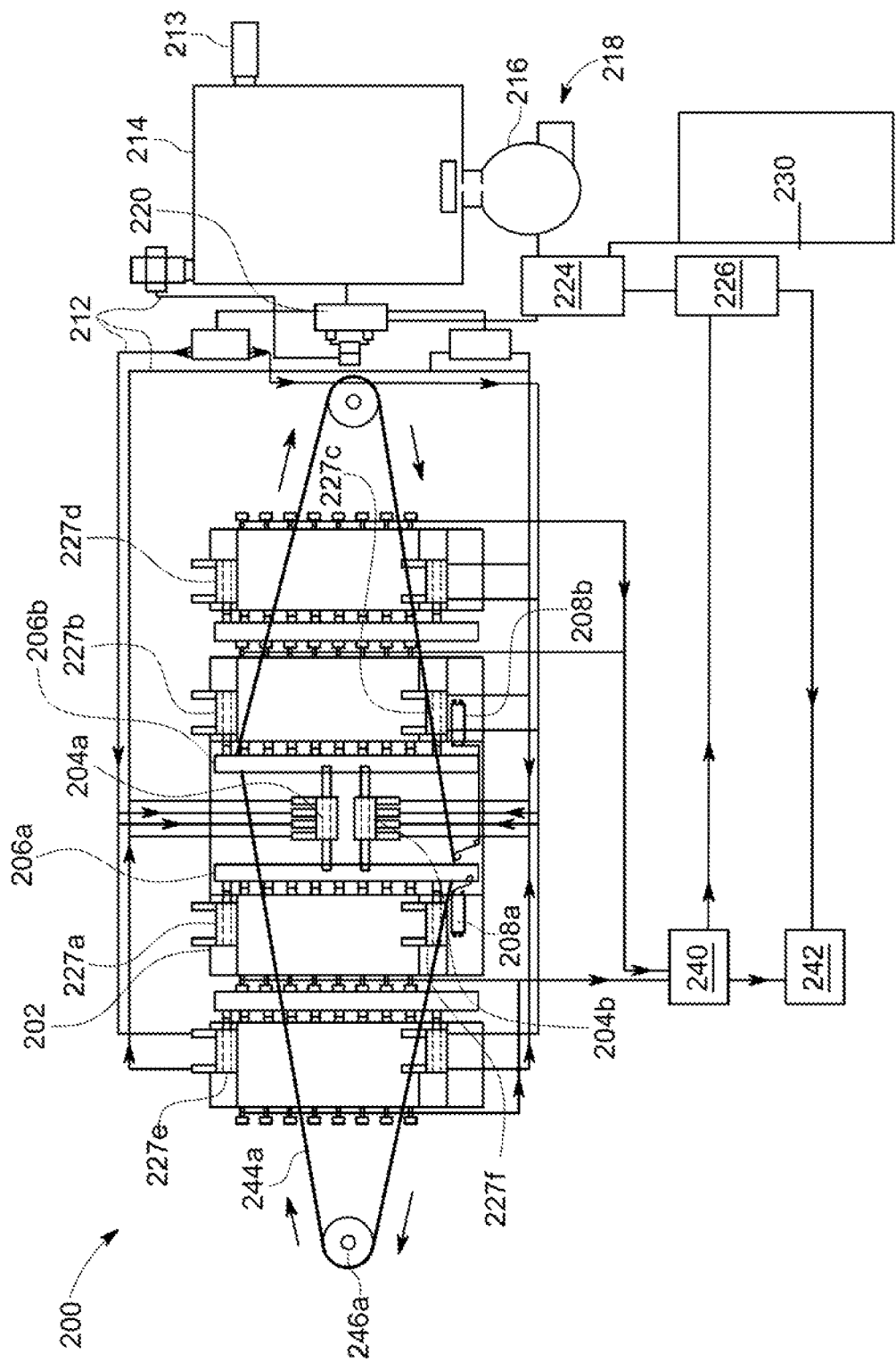
FIG. 2B depicts the components of FIG. 2A in another configuration.

In an exemplary embodiment, as shown in FIGS. 2A-2B, an energy storage and conversion system 200 includes a housing 202, one or more central pistons 204 (e.g., 204a, 204b), one or more distal end pistons 227 (e.g., 227a-227f), one or more drive bars 206 (e.g., 206a-206c), relay controllers 208 (e.g., 208a, 208b), an adjustable release valve 222, and a series of linear generators 210 (e.g., 210a-210d). A series of air hoses 212 (e.g., 212a-212d) connects a chamber 214 for containing compressed gas to housing 202. A compressor motor or pump 216 is used to fill chamber 214 from a gas source 218, which may preferably be ambient air.

A relay or control module 220 is used to regulate compressed air stored in chamber 214 and released to housing 202. An adjustable release valve 222 may be included to allow any excess pressure to be released. Additional components of system 200 may include a water collection/filtration system 213, a first battery 224, a second battery 226, a mode switch 228, an auxiliary power source 230, a series of input and discharge valves 232 (shown in detail in FIGS. 3B and 3D), a control connector valve 234 (between compressor motor 216 and storage chamber 214), a second control connector valve 236 (between relay exhaust valves and storage chamber 214), a single directional flow valve 238, a transfer control 240 can be used to switch between stored AC, direct AC and direct DC output, and an electrical outlet or consumption source 242. A pulley system may be included that has pulley wheels 244 (e.g., 244a) and cords 246 (e.g., 246a) that are attached to drive bars 206. Arrows along cords in FIGS. 2A and 2B are used to indicate the direction cords 244 move when pistons 204 are moving.

Figure 3A:
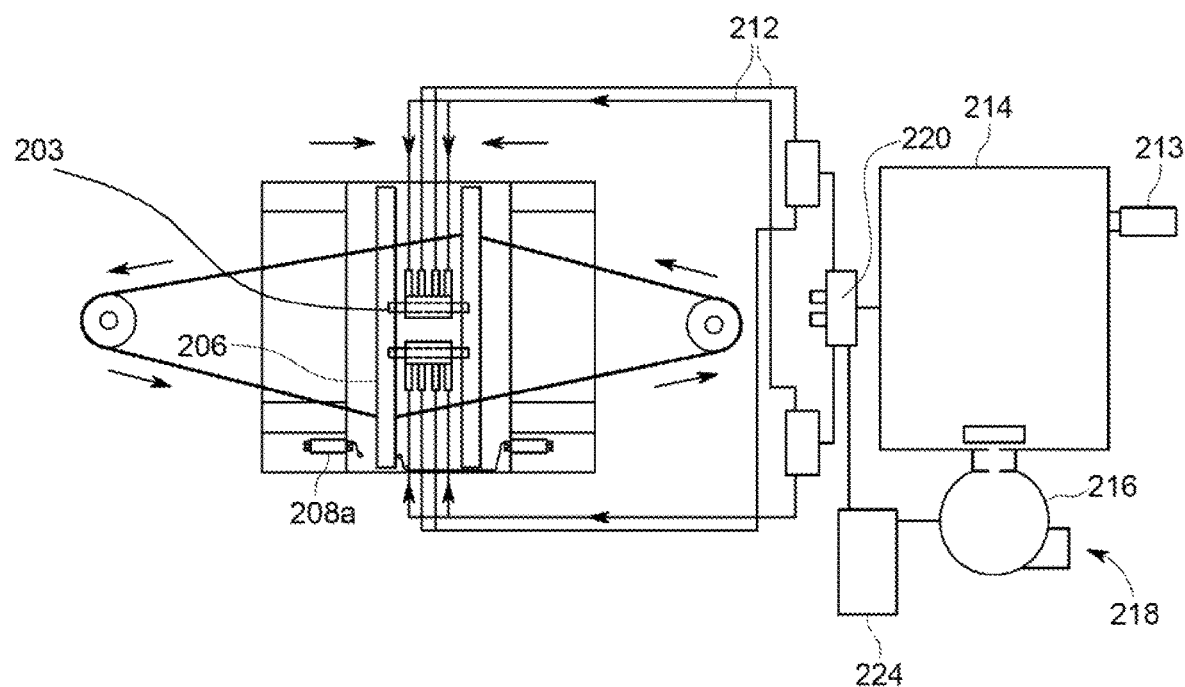
FIG. 3A depicts certain components of an energy storage system in accordance with another embodiment of the present invention.
Figure 3B:
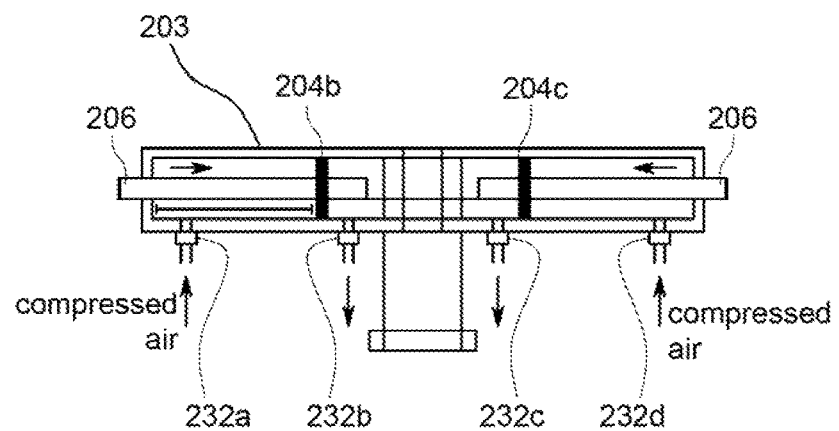
FIG. 3B is a detail view of a portion of FIG. 3A in which pistons are retracted.
Figure 3C:
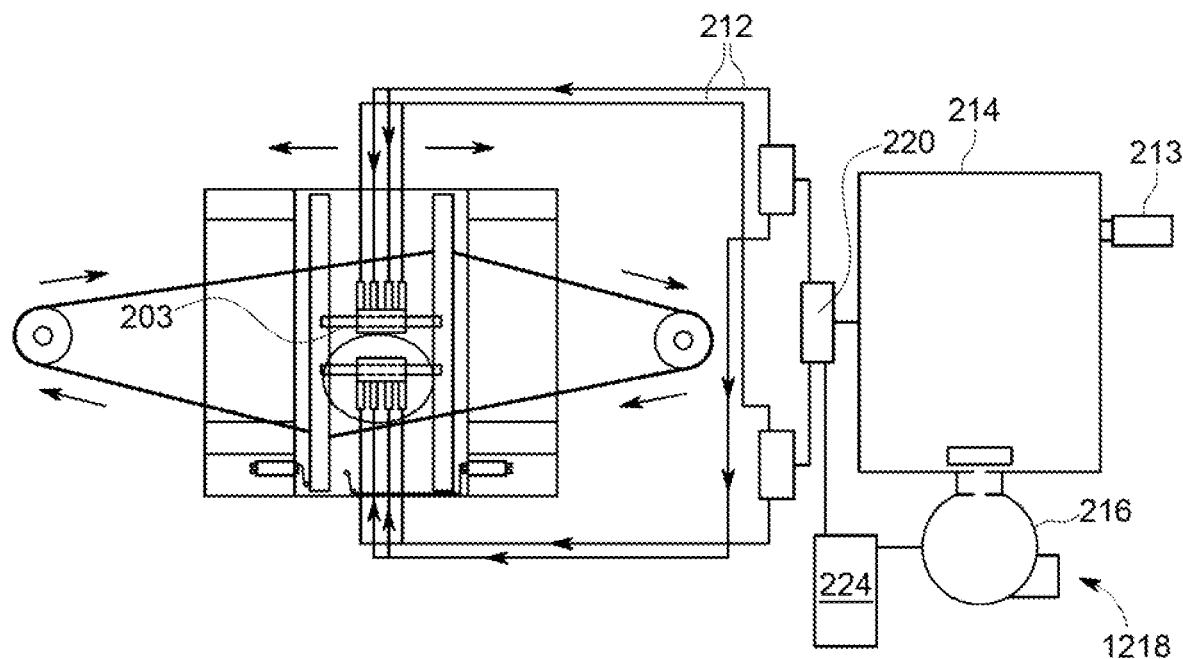
FIG. 3C depicts the components of FIG. 3A in another configuration.
Figure 3D:
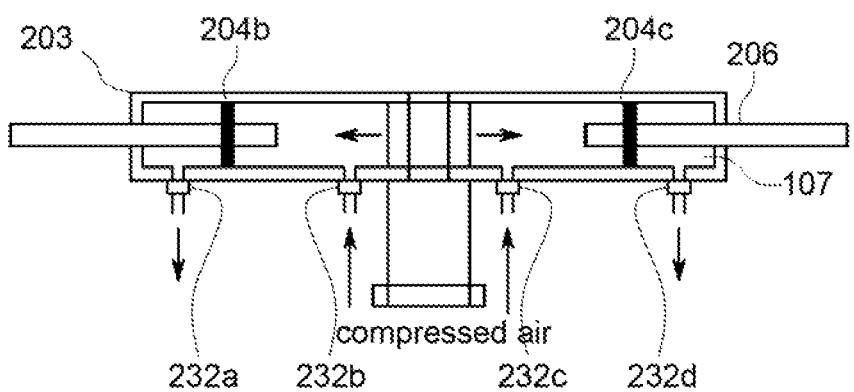
FIG. 3D is a detail view of a portion of FIG. 3C in which pistons are extended.

As shown in FIGS. 3A-3D, when compressed air is released from chamber 214 into piston housing 203, pistons 204 are driven by air pressure between retracted positions (FIGS. 3A-3B, where FIG. 3B is a schematic detail of a portion piston/housing system in FIG. 3A) and extended positions (FIGS. 3C-3D, where FIG. 3D is a schematic detail of a portion piston/housing system in FIG. 3C). As pistons 204 are being moved into the retracted position, outer valves 232a and 232d allow compressed air in while inner valves 232b and 232c allow air to be discharged from housing 203. As pistons 204 are being moved into the extended position, outer valves 232a and 232d allow air to be released from housing 203 while inner valves 232b and 232c allow compressed air into housing 203. This back and forth action causes drives bars 206 to move with respect to generators 210 such that electrical energy is generated.

Figure 4:
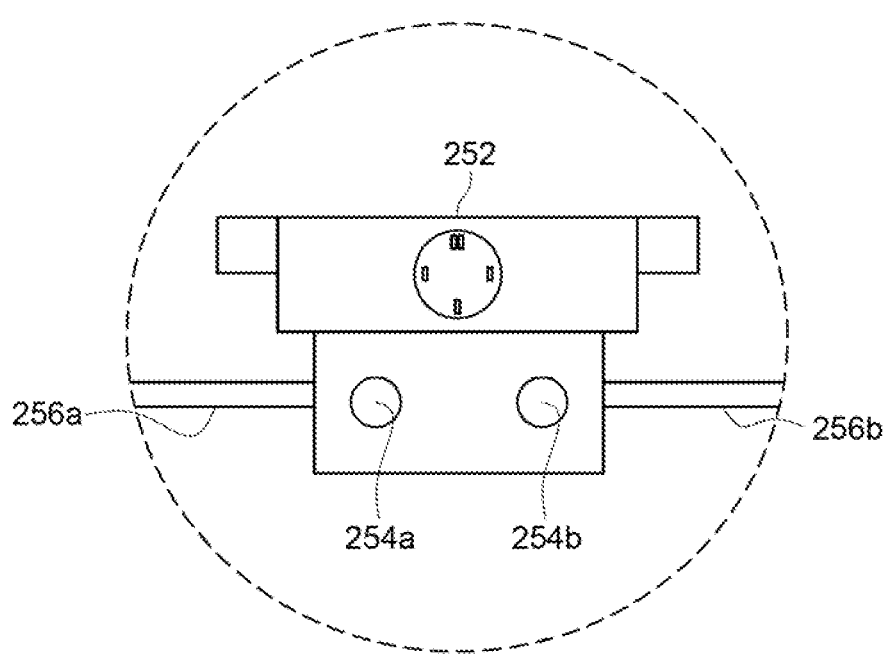
FIG. 4 shows components of the relay control module component of FIG. 2A.

FIG. 4 is a detail view of a pneumatic time release relay or control system 220. Control system 220 includes a control module 252 and valves 254 (e.g., 254a, 254b) that are connected to hoses 256 (e.g., 256a, 256b).

Figure 5A:
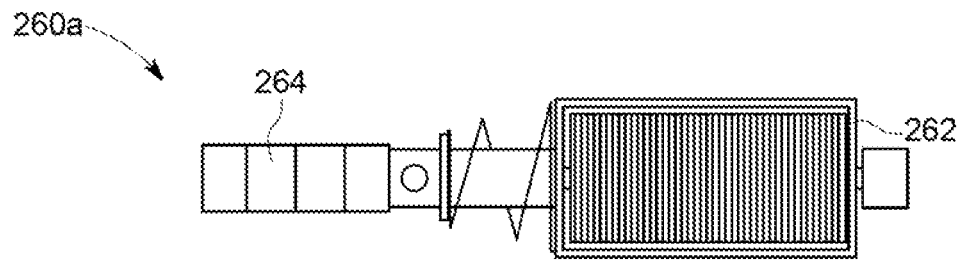
FIGS. 5A-5E depict diagrams of magnetic induction units used in the system to provide direct DC or work with a rectifier to provide DC.
Figure 5B:
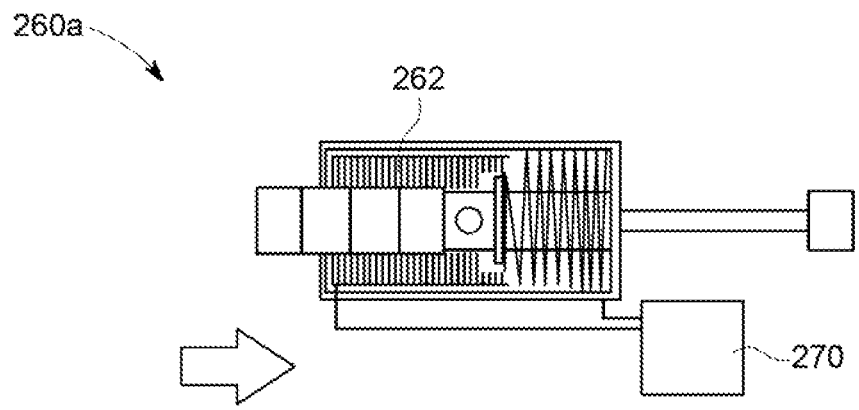
Figure 5C:
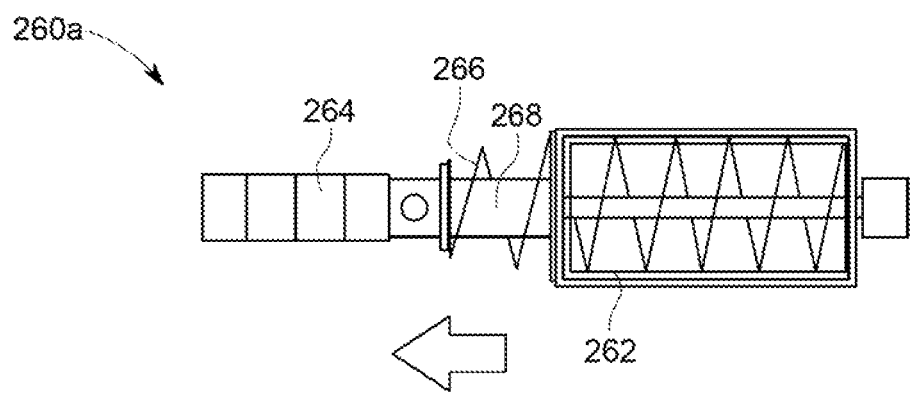
Figure 5D:
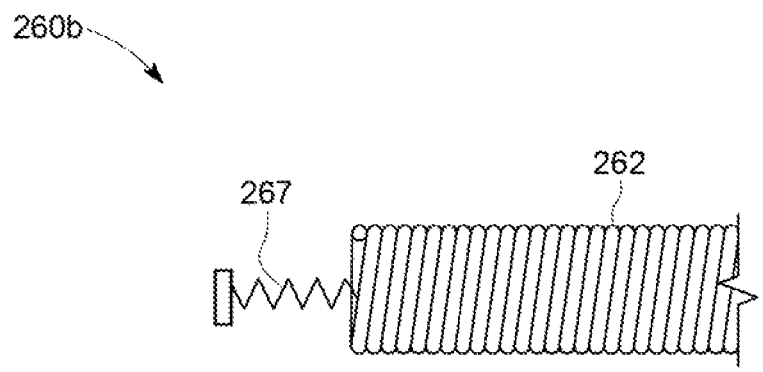
Figure 5E:
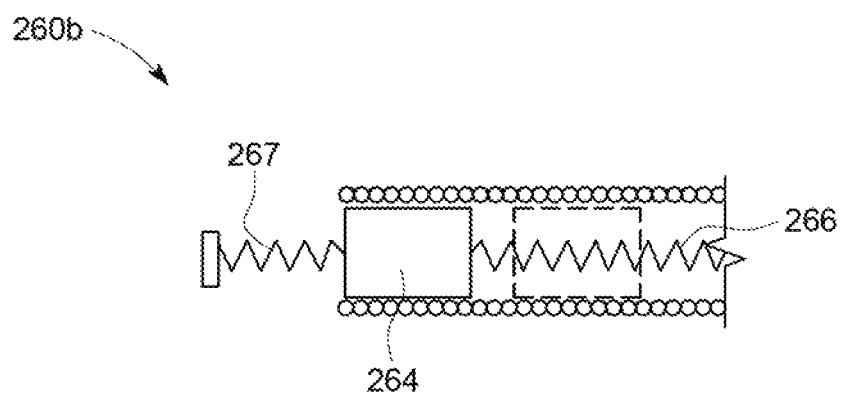

FIGS. 5A-5E depict views of various types of linear generators 260 (e.g., 260a-260b) that may be used to compile series of linear generators 210. For example, magnetic induction generators 210 generate electrical energy by converting linear motion of drive bars 206. Each generator 260 includes an induction coil 262 and a magnet 264. Springs 266, 267 may also be included as well as metal bar 268. Generator 260 may also be connected to a rectifier 270 (as shown in FIG. 5B). Magnet 264 is designed and configured to move back and forth inside of an induction coil 262. Each magnet 264 magnetizes a metal bar 268 that works with a first spring 266 to reset metal bar 268 back to its original position and reciprocate the kinetic energy. Magnets can be separated by a magnetic shielding divider or wall to prevent magnetic interference. Generator 260 can include an optional second spring 267 to assist in reciprocating the weight of the combined magnet and metal bar. The first spring 266 is located on a side of the magnet 264 opposite of second spring 267. First spring 266 connects magnet 264 to one end of housing 202 such that magnet 264 can travel back and forth within induction coil 262. Second spring 267 extends away from the adjacent end of housing 202. In this manner, either magnet 264 or first spring 266 may interact directly with drive bar 206.

Figure 6A:
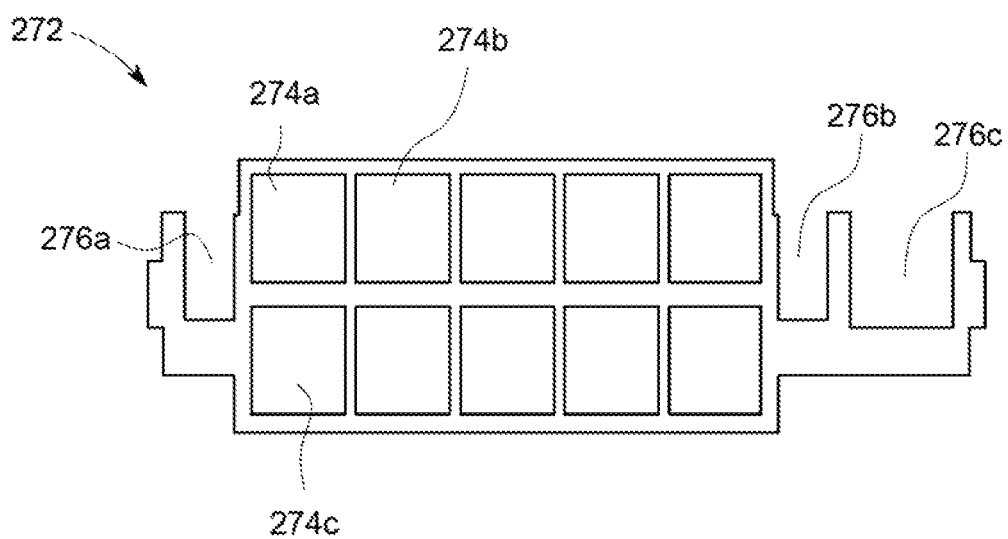
FIGS. 6A-6B are front and perspective views of piezoelectric housing.
Figure 6B:
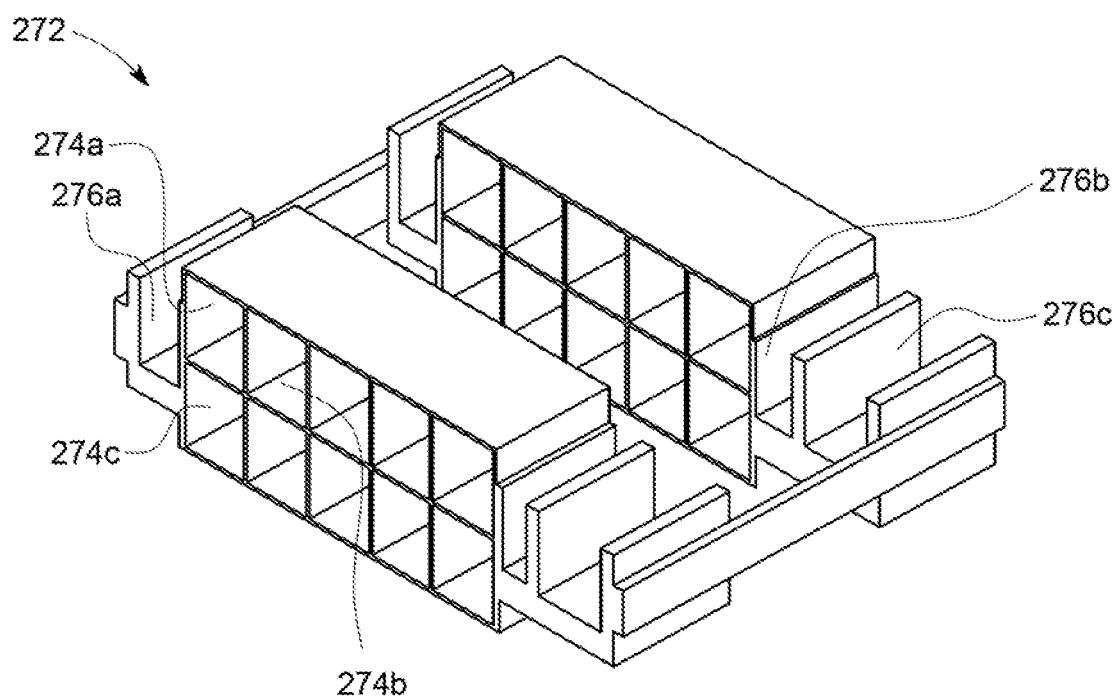

In FIGS. 6A-6B, a piezoelectric housing 272 is shown that includes slots 274 (e.g., 274a-274c) configured to house linear generators and sleeves 276 (e.g., 276a-276c) for holding relay controllers as well as additional distal end pistons.

Figure 7:
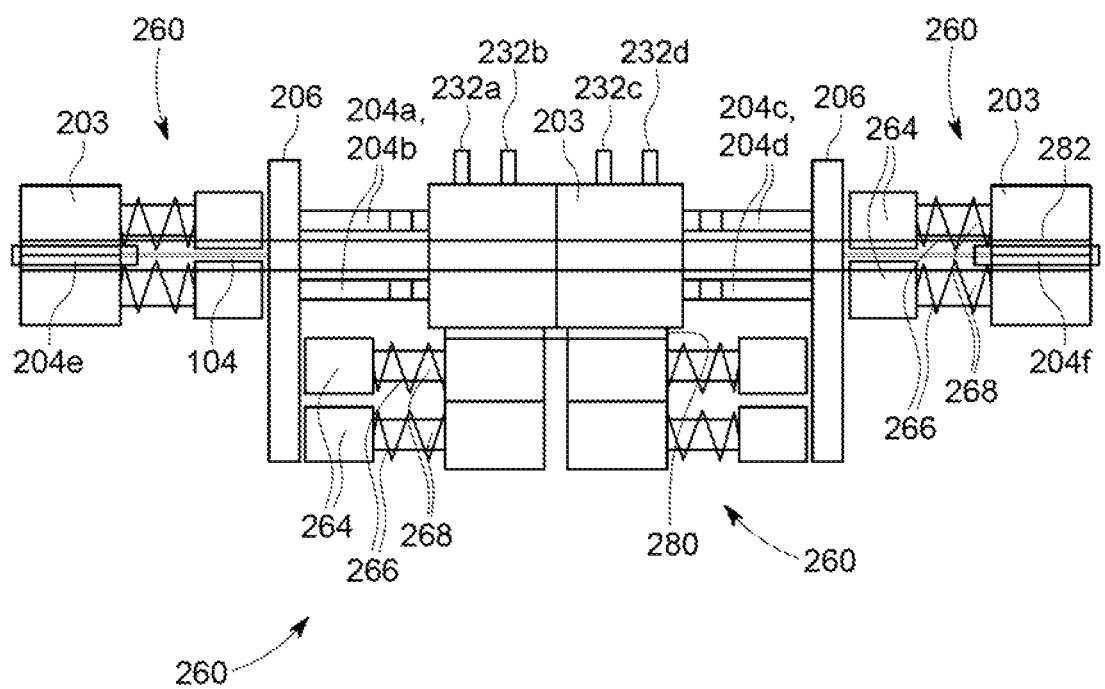
FIG. 7 is a side view of housing, piston system, and linear generators in accordance with another embodiment of the present invention.

FIG. 7 is a side view of housing 202 showing an arrangement of drive bars 206, central pistons 204a-f, including distal end pistons 204e and 204f, and generators 260. In this configuration, generators are positioned under the piston system as well such that those generators are triggered by the drive bars during retraction, thereby increasing system efficiency.

Figure 8:
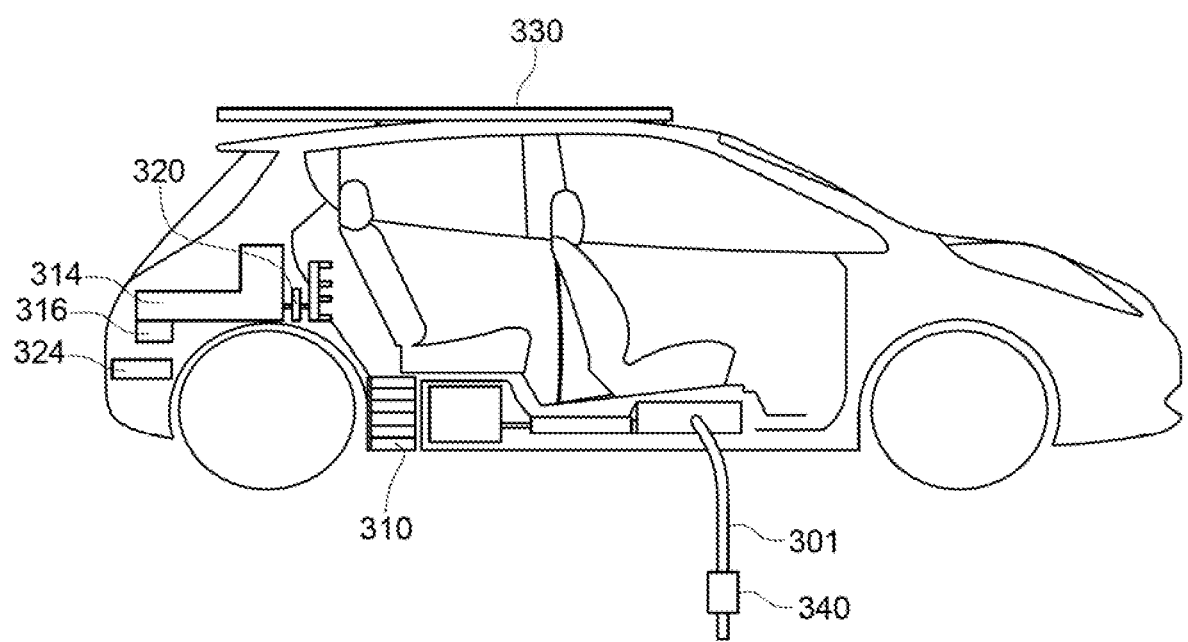
FIG. 8 depicts an electric vehicle-to-grid application of the present invention.

An application of the present invention is shown in FIG. 8, in which an automobile 300 is outfitted with a charging cord 301, an auxiliary power source 330, a rectifier and inverter 340, a control module 320, a compressed air storage chamber 314, a gas compressor 316, a battery 324, and linear generators 310.

Figure 9:
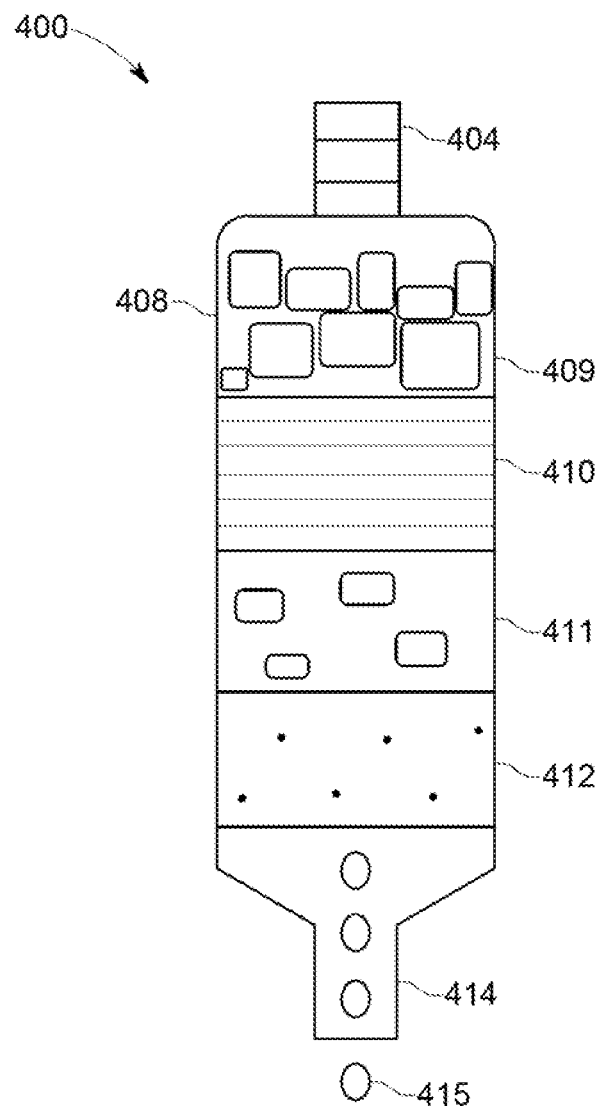
FIG. 9 depicts a portable water filtration system that connects to a port on a compressor gas storage chamber in accordance with an embodiment of the present invention that filters water extracted by the system.

FIG. 9 shows a water filter system 400 that includes a port 404 that can be connected to the compressed air storage tank and a housing 408 that contains various filtration media such as layers of gravel 409, sand 410, charcoal 411 and a cheesecloth or coffee filter 412. Filtered water 415 then exits through outlet port 414.

In operation, a reciprocating bar-based barrel uses a drive bar that works in conjunction with a pulley system to transfer kinetic energy to piezoelectric components, which in turn store the transferred energy electrically. The air or other gas is initially compressed by a motor driven by one or more energy sources, which may include renewable energy sources, such as solar, wind, or hydroelectric, or other sources of electrical energy, via a first battery. This stored compressed air can then be used to generate, via pneumatic pistons in conjunction with piezoelectric generators, high density electrical energy. The high density electrical energy can be used or transferred into a second battery for later use. The second battery, in turn, interconnects with renewable energy sources to allow for bidirectional flow for electrical balancing so that multiple sources of electricity may be utilized efficiently depending on current production.

In an exemplary embodiment, a compressed gas energy storage system includes a barrel housing with a plurality of traversing drive bars that serve to transfer the energy from the compressed gas to piezoelectric components. The barrel housing is preferably hollow and includes distal ends that interconnect using side rails, and includes open space in between distal ends.

Each distal end includes multiple sleeves to house piezoelectric components as well as multiple linear generator sleeves that house linear alternators or generators, distal end pistons, and relay controllers. The sleeves extend lengthwise along distal ends. The drive bar is interconnected with a piston rod of pneumatic pistons that are centered in open space between the distal ends of housing. The drive bar engages linear generators and traverses back and forth between distal ends. A pulley system and/or a spring system works in unison with piston rod to traverse drive bars in opposing directions, where one end of pulley cord is attached to drive bar located at one distal end while the other end of pulley cord is attached to another drive bar located at an opposing distal end. Pulley cord will traverse around a pulley wheel thereby reducing the pneumatic energy required to push pistons through open space approximately in half.

The pulley system includes at least a pair of pulley wheels and cords and is designed to work in conjunction with the pressurized air to assist in the motion of pneumatic pistons. On one side, a first end of pulley cord is attached to drive bar near one end of drive bar while a second, opposite end of pulley cord is attached to another drive bar on an end opposite the end of drive bar where the first end of pulley is attached. On the other side, a first end of second pulley cord is attached to drive bar near where the second end of the pulley cord is attached while a second, opposite end of the pulley cord is attached to the drive bar near where the first end of the pulley is attached. This arrangement facilitates the push-pull traversing motion of the pistons when the gas source is applied as pressure, enabling the cord to traverse around the pulley wheel to reduce the volume of compressed gas required to traverse the pistons. Preferably, the reduction may be by as much as half or more, depending on the number of pulley systems incorporated or applied.

One end of the pulley cord is attached to one distal end drive bar, while the other end of the cord is attached to the opposing distal end drive bar. As the cord is pulled by one distal end drive bar, the pressure or pound per square inch necessary for traversing the drive bar by the pistons is divided in half or more by the wheel or rim width of the pulley wheel as the cord traverses around the pulley wheel. This reduces the force required, or volume of gas or pressure needed, to push the linear generators down by half or more. This is due to the fact that, as gas forces the piston to expand in one specific direction, the pulley cord is pulled in that direction by that distal end drive bar, while the other end of the pulley cord that is attached to the opposing drive bar is simultaneously being pulled in the opposite direction by gas or pressure output as well. The volume of pressure required to push the linear generators without a pulley system would be substantially greater. For example, 10 pounds per square inch may be needed in a system without a pulley system, while the incorporation of a pulley system can reduce the volume of pressure required to push the linear generators in half or more, to 5 pounds per square inch. This conserves pressure discharge, which will allow the gas source to be used more efficaciously.

The barrel housing also includes a plurality of linear generators at each of the distal ends positioned in housing sleeves. Linear generators draw kinetic energy from the drive bar when in contact therewith. As the drive bar traverses back and forth between distal ends, via the pulley cord and pulley wheel with a shaft in its center to position it between the columns, kinetic energy is transferred to the linear or magnetic induction generators. Since the piston rods and hence drive bar are driven by compressed air, the energy stored in the compressed air is converted into stored electrical energy. In particular, the drive bar applies kinetic force when in communication with linear or magnetic induction generator; upon contact with the linear or magnetic induction generator, the kinetic force therein is transferred to the piezoelectric components (i.e., relay controllers and linear or magnetic induction generators) positioned in the housing sleeves.

In this way, the plurality of magnetic induction generators produce electricity, which is transferred to the second electrical energy storage unit.

The pneumatic pistons, positioned between distal ends, work in unison with distal end pneumatic pistons positioned next to the generators to work in unison with interconnected piston rods. A pulley drive system including a pulley cord, pulley wheel and wheel shaft pull drive bar in opposing directions so the drive bar can apply applicable force to traverse each drive bar back and forth in opposing directions in a push-pull manner along the inside of barrel housing. The centered double-sided, dual-acting pneumatic pistons as well as the distal end pistons comprise of a plurality of piston rods that can traverse in opposing directions when pressure is introduced into their areas. Optionally, a spring may be coupled with an internal piston. Regulated by relay controllers that send a command to a relay or control module that regulates the directional flow of gas into a gas storage chamber, which supplies compressed gas to all of the pistons via compressed air hoses. As an alternative to using relay controllers, relay or control module can utilize motion detection sensor switches or can use a pneumatic timing release relay or control module to switch the directional flow of compressed gas on a timer or sequential manner towards one pair of centered pneumatics pistons without the usage of automatic or manual action controllers that rely on kinetic force applications from drive bars. Located at each distal end, motion detection sensor switches select a region of the drive bar to monitor movement using an emitted light to compare sequential images, changes or interruption in light pattern. If enough light changes between those frames, the software determines that movement occurred and sends the relay an alert to trigger motion of the pneumatic pistons by sending a command to the relay to release gas as pressure into targeted air hoses. Pneumatic timing release relay or control module releases gas as pressure to air hoses in a sequence based on timing action that is halted by removing voltage from the coil. When voltage is applied to the coil, the contacts energize and de-energize alternatively, making on and off cycle timing lengths adjustable so the time release can reoccur or happen again. Air hoses interconnect relay or control modules with valves of pneumatic piston and its internal piston or chambers as air hoses work as both gas admittance and simultaneously gas release units. Air hoses direct pressure controlled by the relay to enter one side of piston and release pressure using air hoses direct the released pressure to a release valve interconnected with the relay or control module.

The release valve is adjustable and serves to lock gas within the tank until a desired pressure is reached, such as 120 psi. If the desired pressure is set to 120 psi, then the system will be closed and pressure will buildup in gas storage chamber until 120 psi is reached, at which point release valve will release any excess flow. This arrangement allows the system to avoid unnecessarily draining the operational battery by leaking air at lower pressures while it also allows the system to work with a constant pressure for operating the pistons while renewable energy is available.

The gas storage chamber is supplied with compressed gas from a compressed gas source and stores it as pressure (heat). Moisture from a gas source builds up over time within the compressed gas storage chamber as the high ratio of gas within the volume of the compression chamber heats up during compression, releasing moisture, and likewise cools down during expansion. A water filtration unit, which can consist of a rectangular, bottleneck housing with filtration layers like gravel, sand, charcoal, and a cheesecloth or coffee filter to filter water contaminants, may be included and can interconnect with an intake/outtake port of the gas storage chamber. In this way, moisture from the compressed air can be directed into water filtration system so that filtered water may be collected.

Linear or magnetic induction generators produce electricity by absorbing kinetic pressure from a drive bar; wherein the kinetic pressure is transferred into movement of a magnet back and forth inside of an induction coil. Each magnet magnetizes a metal bar that works with a first spring to reset the metal bar back to its original position and reciprocate the kinetic pressure. Magnets can be separated by magnetic shielding divider or wall to prevent magnetic interference. The generator can include an optional second spring if necessary, to assist in reciprocating the weight of the combined magnet and metal bar. The first spring is located on a side of the magnet opposite of the optional second spring. The first spring connects the magnet to the distal end of the barrel housing such that the magnet can travel back and forth within the induction coil. The optional second spring extends away from the adjacent distal end of the housing. The magnet or first spring is responsible for hitting against the drive shaft or bridge bar. It shall be noted that the magnet produces electricity as it traverses back and forth inside the induction coil.

The movement of the magnet back and forth within the induction coil is accomplished by virtue of the first spring and the optional second spring in communication between the drive bar and the distal end of the housing. It shall be noted that as the drive bar traverses back and forth inside of the barrel housing, the housing of the drive bar applies kinetic pressure to the first spring to extend and retract, which causes the magnet to magnetize the metal bar to move back and forth inside of the induction coil thereby producing electricity each time the housing of the drive shaft bar traverses to each distal end. The AC electricity that is produced by the linear or magnetic induction generators are converted to DC by rectifiers. A transfer control can be used to switch between stored AC, direct AC and direct DC output when stored AC is not presently optional.

Linear or magnetic induction generators can be aligned in an array (e.g., rows and columns) to trigger each other within their respective stationary sleeves, where distal end of housing includes a plurality of linear generators that can also be aligned in an array at the rear of the prior row of linear generator-based distal end sleeve of housing. A rear stem or metal bar of linear generators are elongated as a result of kinetic force applied to push down metal bar of linear generator. Rear stems or metal bars can rest on a secondary drive bar performing as a magnetic divider that rest on magnets of a secondary row of magnetic induction generators so applied kinetic force is transferred from the first row of linear generators to the second row of magnetic induction generators and any other rows of linear generators following thereafter. A singular pneumatic pressure input source can allow an array or series of linear or magnetic induction generators to be influenced or triggered to simultaneously produce an electric current discharge or discharged electric current per spring reciprocating cycle.

A first energy storage can be interconnected with a second energy storage such that electricity produced by the magnetic induction generators can be transferred by a wire to supply electricity to second electrical energy storage unit and then an inverter for supplying electricity for end use. While first electrical energy storage unit stores energy from a portable auxiliary one or more external power sources, such as a renewable energy source or other source of electric supply, which may be portable, to supply power to the on-demand motor of the compressed gas source. A motor is used for facilitating the compression of the gas.

Gas from stored gas source is transferred as pressure (heat) by air hoses using input and discharge valves to and from gas storage chamber, which then transfers the compressed gas as pressure (heat) back to the piston diaphragm of the pneumatic pistons. Double-sided, dual-acting pneumatic pistons located at the center of the housing, as well as distal end pistons, include a plurality of piston rods that traverse in opposing directions when pressure is introduced into their areas and can include a spring coupled with a piston. Pneumatic pistons are positioned at the center of distal ends of housing as a drive assembly to enable the mechanical motion of piston rods as air hoses connect to input and discharge valves of pneumatic pistons. Pneumatic pistons are also positioned at each distal end of the housing, adjacent to the linear generators and opposing the centered pneumatic pistons.

An adjustable pressure release valve may be included on the compressed air tank. The adjustable release valve will close the pressure exhaust valve of the compressor tank in order to trap stored thermal energy. The adjustable release valve will open the pressure exhaust valve to release excess pressure after specified pressure designation is reached.

The adjustable release valve that is connected to the compressor tank will work with air hoses that are connected to the relay exhausts, in which, during Air-to-Electricity Mode, the exhaust pressure from the pistons will be directed through the relay exhausts and back into the compressor tank in order to continue the buildup of pressurized heat or gas, which is an alternative to the compressor motor operating to convert ambient gas into pressurized heat or gas, which would have the exhaust pressure being channeled out the system through the relay exhaust.

The addition of a single-direction valve connector will work with air hoses positioned between the relay pressure exhaust and the compressor gas tank. This single-direction air hose will channel exhaust pressure back into the tank to build pressure in the tank using a pressure recycling process.

The microgrid can be automated or manually activated. It has a dual mode that can be switched back and forth.

The dual mode microgrid setting can switch between two modes: Air-to-Electricity Mode and Air-to-Water Mode. A dual mode converter switch—manual, CPU attachment or other—may be used to convert the microgrid from Air-to-Water Mode to Air-to-Electricity Mode.

In Air-to-Water Mode, exhaust pressure is released through the relay exhaust. A dual mode converter switch can extend or retract a retractable single-direction air hose to an interconnecting port of the gas tank. Extending the retractable single-direction air hose to an interconnecting port of the gas tank allows the exhaust pressure to be recycled instead of being released back into the atmosphere in Air-to-Electricity Mode. Retracting the extendable single-direction air hose from an interconnecting port of the gas tank allows the exhaust pressure to channel through the relay exhaust in order to exit into the atmosphere, instead of being recycled back into the compressed gas tank, in Air-to-Water Mode.

In Air-to-Water Mode, the compressor motor uses energy from the first battery to actively or continuously operate and convert ambient gas into storable thermal energy in the form of pressurized gas. The compressor motor may be designed to continue running to prolong the air-to-pressurized gas conversion process in order to collect the increase of humidity in the air during certain times of the year. The batteries will support the continued operations of the compressor motor. The generators will store energy into the batteries. This design will still produce excess electricity at the expense of energy efficiency, since the compressor motor operations will be the primary focus.

In the Air-to-Electricity Mode, the exhaust pressure will be recycled back into the gas tank to increase stored pressurized gas without the compressor motor continuously operating, which will not only conserve the motor from draining energy from the operational battery but also sharply increase the energy efficiency in terms of the volume of stored thermal energy in the tank and the speed of filling the tank to capacity since the adjustable release valve on compressor storage tank is able to close the valve so buildup pressurized heat or gas cannot escape while the pressurized heat or gas is being recycled back into the compressed gas tank, which will sharply increase the volume of pressurized heat or gas within the compressor gas tank. High density electricity can be later produced from recycling the gas, with no drainage from a compressor, since recycling the pressure will significantly increase the volume of high density pressure in a fraction of the time, which can significantly increase the cycle of the generators. The batteries will store all excess electricity and the compressor motor will operate once in order to convert air into stored pressurized heat or gas within compressed gas tank so the pressurized heat or gas can then be recycled throughout the pistons, back into the compressed gas tank and out the tank using the adjustable release valve that is connected to the compressed gas tank.

A smart meter may also be included for tracking water volume, volume accumulation, usage and sales. Another smart meter may be included in the system for tracking electrical generation, storage, usage and sales The housing includes valves located at each distal end and a wall that divides the housing into two areas. This allows one chamber or area for each piston, which oppose each other. The relay or control module directs pressure to respective air hoses to supply pressure to each housing areas in order to traverse the piston rod. As one area is supplied pressure, the opposing area discharges pressure back the release relay or control module by using air hoses to input and discharge pressure.

The wall separates the housing into two adjacent gas storage chambers so that pressure (heat) is maintained on one side of the housing, which will discharge pressure in the adjacent area in order to push the piston. Gas is alternately compressed on one end of the piston rod while expanded on the opposing end to continually move the piston back and forth in a push and pull manner. Pneumatic pistons are designed with a gas input and discharge valves that are supplied gas as pressure by air hoses that make up the valve system comprising of electromagnetic solenoids and standard valves that are interconnected with gas storage source. Each gas storage chamber is designed with either a valve for gas input/discharge processes or a combined gas storage chamber and spring configuration where pressure is applied to one end of the piston, facilitating the spring to first retract then extend back to its original position. The pressure input on one side of the piston enables pressure (heat) to be discharged on the other end of the piston if the pneumatic piston has two valves. If the pneumatic piston has a pressure (heat) 139 and spring 123 configuration, then a single valve can be used to input and discharge gas to move the rod forth while the spring is used to apply opposing force as it retracts and extends, thereby applying opposing force from using the inner surface of the pneumatic piston. There will be sequential pressure discharging on one side of the pneumatic piston rod to traverse or push and pull the piston rod to achieve sequential movement in the opposite direction. The rod or rod wall is linked to the internal piston. The piston interconnects with piston rods that interconnect with the drive bar. Pressure (heat) released or regulated to centered pneumatic pistons by relay or control module that uses manual or automatic activation relay controllers that are positioned at each distal end of the barrel housing to release pressure that will move piston rod a certain length until the pressure (heat) is discharged out a discharge valve to facilitate the sequence of pressure input and discharge provided by either stored compressed heat gas source or other acting on the piston to achieve movement in the opposing direction to traverse the rod, thereby traversing the drive bar to promote pneumatic force storage manipulation onto distal end drive assembly of the housing that includes a relay controller switch and a plural of linear generators or a pneumatic timing release relay or control module and no relay controller.

It shall be noted that each midpoint between the distal ends of the housing may include at least one double-sided, dual-acting pneumatic piston, while the distal end of the housing may include at least one magnetic induction generator per distal end and one piston that opposes the double-sided, dual-acting pneumatic piston.

The system may also include manual action controllers that are positioned at both distal ends of the housing. The manual action relay controllers operate manually through piezoelectric components when force is applied, which triggers a command to be sent to relay or control module that regulate the released direction of the compressed gas to pneumatic pistons located at midpoint between the distal ends. Optional automatic relay or control module that works on a timing release relay or control module can be used instead of using distal end relay controllers to input and discharge pressure to and from pneumatic pistons using air hoses interconnected with the relay or control module and to valves on the pneumatic pistons. Pneumatic timing release relay or control module releases gas as pressure to air hoses on a timing release control based on timing action that can continue to do over until ceased by removing current from its coil with time.

As described above, the barrel housing configuration includes a drive bar that uses compressed gas to traverse back and forth in order to transfer kinetic pressure to a drive assembly configuration of linear or magnetic induction generators and relay controllers provided at distal ends of barrel housing. The interior of the housing is outfitted with a double-sided, dual-acting pneumatic piston positioned at the center or midpoint between the distal ends of the housing, as well as distal end pneumatic pistons located adjacent to the linear generators, where the pistons house rods that simultaneously traverse a plural of drive bars into linear generators to produce electricity as pressure is supplied and discharged to the internal gas storage chambers of the pistons to traverse the opposing piston rods simultaneously towards their distal end generators. The drive system comprising of pressurized gas, pistons and drive bars also comprises a pulley systems located at each distal end of the piezoelectric housing that work with the piston rods and interconnected drive bars to cut the usage of the volume of gas to move the weight of the plural of linear generators and manual action relay controllers in half. This design will enable the pneumatic pistons to utilize compressed gas to facilitate movement of the piston rods. A drive bar is used as a bridge to interconnect one piston rod to the other. The drive bars allow for the two pneumatic pistons positioned at midpoint between the distal ends of the piezoelectric housing to work in sequential unison when applying kinetic force to distal ended linear or magnetic induction generators.

Rows of linear generators within a cartridge setting can be added to the above described microgrid design. The more pistons that are implemented, the sharper the increase in momentum of the linear generators, therefore, adding more back-to-back rows of linear generators is possible if a proportional number of pistons are added. The microgrid system is a multiplier system in that a plurality of linear generators, each having connector wires to the secondary battery, will be triggered simultaneously but separate connector wires to the battery will enable each of the released currents resulting from the triggered generators to be transmitted individually into the battery and stored in bulk. Therefore, a plurality of linear generators can be triggered simultaneously but transmit current individually whey connected as described.

In addition, the linear or magnetic induction generators can be aligned in an array in order to trigger each other, where distal end housing comprising of a plural of linear generators can be aligned in an array at the rear of the prior row of linear generator-based distal end sleeve housing. The rear stem or bars of the prior linear generators are elongated as a result of kinetic force applied to push down the metal bar of the linear generator. The rear stems or bars can rest on a secondary drive bar or magnetic divider that rest on magnets of a secondary row of linear generators so applied kinetic force is transferred from the first row of linear generators to the second row of linear generators and other rows of linear generators following thereafter; wherein a single pneumatic pressure input source will allow an array or series of linear generators to be influenced or triggered to simultaneously produce an electric current discharge or discharged electric current per spring reciprocating cycle.

The derived electricity from the generators, along with the initial operational energy, which is an auxiliary power source, namely a renewable energy source or other source of electric supply, are then stored into electrical energy storage units. The pneumatic pistons are supplied compressed gas from a compressed gas source, which receives electricity from the first electrical energy storage unit, namely the electrical energy storage unit that receives the initial operational energy, which is an auxiliary power source. In return, upon activation, the pneumatic pistons utilize the compressed gas to apply work to interconnected drive bar inside the barrel housing to awaiting piezoelectric components, namely a plural of linear generators and relay controller that are connected to the relay or control module that regulate gas directional flow. The traversing of the drive bars will continue until either the system activation switch is turned off, or the electrical energy storage units are filled to capacity or the electrical energy storage units are depleted or if the compressed gas resource depletes.

In operation, a combined renewable energy and compressed gas energy storage and generation microgrid system provides energy storage and generation and includes a housing and cross-sectional components either mounted in or outside the housing. A separate housing is used for reciprocating piezoelectric energy production using centered double-sided, dual-acting pneumatic pistons to traverse interconnected kinetic drive bars onto relay controllers and generators. A motorized gas compressor is used to convert and store gas for pneumatic force applications using pneumatic pistons and other pneumatic components. A plurality of linear generators are positioned at each distal end of the separate housing used for piezoelectric energy production. In addition, a plurality of batteries may be included, where an operational battery supplies power to the motorized gas compressor and support battery receives energy from piezoelectric energy production derived from linear generators. An auxiliary renewable energy source or other source supplies energy to the operational battery. A portable water filtration system that connects to the motorized gas compressor may be included as well as a plurality of pulleys and pulley cords that work or interconnect with opposing drive bars that work with pneumatic pistons to traverse opposing drive bars in a push-pull manner towards linear generators by cutting the volume of the pressurized gas required to traverse the linear generators in half.

The housing barrel may have inner hollowed construction, be rectangular in shape, and include distal ends that interconnect using side rails in which each distal end is made up of multiple sleeves to house piezoelectric components as well as sleeves to include linear generators and relay controllers extending lengthwise along an inner surface with which a drive bar that is interconnected with the piston rods of pneumatic pistons that are centered in the clearance space between the distal ends of the housing that engages the linear generators and traverses each distal end drive bar back and forth between distal ends. Gas compressor components as well as auxiliary power source and batteries are located outside the barrel housing as the housing is configured to promote electrical production using pneumatic induction and transference.

The compressor motor converts the outside compressed gas source into stored heat in a gas storage chamber that is used to supply pneumatic force to the pneumatic pistons in order to aid the gas in pushing the drive bars toward piezoelectric components, such as a plurality of linear generators and a relay controller that is located at distal ends of the barrel. The drive bar engages with or applies kinetic pressure to the action relay controllers which sends a command to optional manual relay or control module to regulate the directional flow of input and discharge pressure (heat) directed into the midpoint double-sided, dual-acting pneumatic pistons. The relay controllers, which are located at each distal end, enable newly added pressure to pistons as the automatic or manual relay controllers are connected to the relay or control module that regulates gas pressure directional flow. Alternatively, the automatic relay or control module can utilize motion detection sensors or can come equipped with a pneumatic timer to autonomously switch the directional flow of compressed gas on a timer or sequential manner towards one pair of midpoint pneumatics pistons without the usage of automatic or manual action controllers that rely on kinetic force applications from the drive bars; whereas pistons are receiving newly added pressure input through air hoses supply gas to interconnected to piston valves to extend their piston rods and will sequentially discharging pressure through piston valves to retract their piston rods, thereby traversing the interconnected drive bar in a reciprocating manner since the drive bar is interconnected with the piston.

The piezoelectric housing may include a drive system with a plurality of traversing drive bars that are able to traverse the length of the barrel housing with respect to the length of pneumatic pistons rods. The pneumatic pistons are positioned at the center of each distal end of the barrel housing. The drive bar can be rectangular in shape and may include a sleeve that facilitates the interconnection of the piston rods. The sleeve of the drive bar is engaged upon the piston rods such that as the drive bar goes from one distal end to another distal end using the piston rods. The housing or surface of the reciprocating drive bars is responsible for the kinetic engagement and transference of kinetic force to a plurality of linear or magnetic induction generators when in contact.

Double-sided, dual-acting pneumatic pistons may be used and are located at the center of each distal end of the barrel housing, as well as at each distal end of the barrel housing to oppose the centered pneumatic pistons, and will traverse the interconnected drive bars back and forth along the inside of the barrel. The rod of the piston is interconnected with the drive bar to promote pneumatic-induced movement in which the pistons work with the high ratio of stored gas within the volume of the compression chamber that heats up during compression and likewise cools down during expansion. In addition, stored heat as pressurized gas is supplied to the pistons using gas hoses and input and discharge valves or pneumatic spring configuration to traverse the piston, which in turn moves the piston rod a certain distance until the pressure is discharged out a discharge valve to facilitate the pressure input and discharge process when the drive bar applies kinetic energy to the opposing relay controller that is connected to an outside relay or control module that regulates directional gas pressure flow. In this way, air is converted into stored heat by the compressor motor, which is then stored in a chamber and supplied to the pneumatic system.

Components of the opposing influenced assembly located in each sleeve of the housing that the drive bar triggers are linear magnetic induction generators that produce electricity upon movement of magnet back and forth inside of induction coil. These generators can include either a spring only or a first and optional spring configuration to promote push down and reset of the magnetic induction bar or magnetic induction process that results in a discharge of a current. The first spring configuration has the spring positioned on one side of the metal bar to facilitate spring release and retraction processes, while the optional first and optional second spring configuration has the first spring located at the opposing side of the magnet and metal bar; in which magnet can traverse back and forth within induction coil.

The magnet and first spring extend away from each distal end of the barrel, and are responsible for hitting against said drive bar and the magnet traverses back and forth within induction coil to discharge a current. Movement of the magnet back and forth within the coil is accomplished by virtue of first spring only or a configuration of first and optional second spring. The drive bar traverses to each distal end of barrel housing in a reciprocating manner to facilitate any applied kinetic pressure associated with movement by using drive bar frame as kinetic force application as it traverses back and forth within the barrel.

AC electricity is produced by linear magnetic induction generators when kinetic pressure is applied by drive bar or drive bar housing and is transferred to a rectifier that converts AC to DC current. A transfer control can be used to switch between stored AC, direct AC and direct DC output when stored AC is not available. Electricity produced by magnetic induction is then received by a battery or other electrical energy storage unit by wire or wireless induction.

Wireless recharging capabilities can be adopted into the microgrid system of the present invention. A wireless charging transmitter can work with a wireless charging receiver to recharge end users wirelessly.

The gas compressor may receive electrical power from a battery or other electrical energy storage unit, which receives auxiliary power from interconnected, external, portable and renewable power source or other source of electric supply, where the renewable power source may be solar, wind, etc.

A manual or automatic activation switch may be used to start the microgrid system. The microgrid activation switch interconnects the battery to operational componentry, including the relay or control module and motorized pump of gas compressor unit. Pneumatic pressure is derived from gas storage chamber of the compressor unit.

Double-sided, dual-acting pneumatic pistons, or pistons with opposing rods that face opposing distal ends of the housing that can simultaneously traverse in and out in a reciprocating, push pull manner, are positioned at the center of each distal end of the barrel housing to convert reciprocating manner high ratio of pressure as heat stored within the gas storage chamber into mechanical motion using their internal componentry as air hoses connect to input and discharge valves of pneumatic pistons. A pneumatic force component with an internal surface that includes a gas storage chamber with valves located at the center of each distal end of the housing that use a piston rod wall in the gas storage chamber as a pressure (heat) divider for each distal end of the housing. The relay or control module directs pressure to respective air hoses to supply pressure to respective distal end gas storage chambers of the piston to traverse the piston rod. As the front gas storage chamber is supplied pressure, the opposing gas storage chamber of the piston discharges pressure back to the release valve located at the relay or control module by using air hoses to input and discharge pressure. The wall of a rod separates the single gas section of the piston into two adjacent sections in order for pressure (heat) to input one side of the gas storage chamber, which will discharge pressure in the adjacent gas storage chamber to traverse the piston rod and rod wall. The volume of gas compresses on one end of the rod wall while an opposing volume of gas expands on the opposing end, forcing the rod back and forth. The pneumatic pistons are designed with a gas input and discharge valves that are supplied gas as pressure by air hoses that make up and work with the valve system that is interconnected with the relay or control module that interconnects with the gas storage source. Air hoses interconnect with sides of pistons using valves as the air hoses work as both gas admittance and simultaneously gas release units, depending on the piston distal end that gas working as pressure is being directed— inputted and released—as air hoses direct pressure controlled by the relay to enter one side of the piston and release pressure using the air hoses that direct the released pressure to a release valve interconnected with the relay or control module. Each piston gas storage chamber is designed with either a valve for pressure input and discharge processes or a combined gas storage chamber and spring configuration. When pressure is applied to one end of the piston, the spring first retracts and then extends back to its original position. The pressure input on one side of the piston enables pressure (heat) to be discharged on the other end of the piston if the pneumatic piston has two areas for gas with two valves, or if the pneumatic piston has a pressure and spring configuration, then a single valve can be used to input and discharge gas to move the rod forth while the spring is used to apply opposing force as it retracts and extends, thereby applying opposing force from using the inner wall of the pneumatic piston. There will be sequential pressure discharging on one side of the rod wall to traverse the piston rod to achieve sequential movement in the opposite direction. The rod wall is interconnected to the rod, which is interconnected to the internal piston. The piston interconnects with rods that interconnect with the drive bar. Compressed heat is released or regulated to midpoint pistons by manual or automatic activation relay controllers located at each distal end will send a command to the relay or control module that regulates the gas or pressure directional flow to direct pressure to move piston rod a certain length until the compressed heat is discharged out a discharge valve to facilitate the sequence of pressure input and discharge provided by either stored compressed heat or other acting on the piston or piston rod to achieve movement in the opposing direction to traverse the rod to promote pneumatic force storage manipulation onto distal end influenced assembly of the barrel housing that includes a relay controller and a plurality of linear generators or a pneumatic timing release relay or control module and no relay controller. On each side of the gas storage chamber are opposing pneumatic pistons that are located at each distal end of the piezoelectric housing.

The gas compressor is preferably powered by a battery, which may be connected to an auxiliary power source or an electrical grid, when available. The compressed gas is stored within a gas storage chamber. The system utilizes the generated compressed gas to apply kinetic pressure to a plurality of piezoelectric components, such as relay controllers and a plurality of linear or magnetic induction generators to produce electrical energy. The electrical energy produced from this process may be used immediately or stored for later use in a second batter. (The second battery stores energy from the compressed gas, whereas the first battery, or the operational battery, converts or stores electricity from renewable energy sources or an electrical grid.

Moisture produced from the compressed air may be collected and stored within the compressed gas storage chamber if ambient air is used as a source of compressed air. The water filtration unit, which can consist of a rectangular, bottleneck housing with filtration layers like gravel, sand, charcoal and a cheesecloth or coffee filter to filter water contaminants, can interconnect with an intake/outtake port of the gas storage chamber so moisture can be directed into the water filtration system to supply filtered water.

The linear generators can be aligned in an array to trigger each other, where distal end housing comprising of a plural of linear generators can also be aligned in an array at the rear of the prior row of linear generator-based distal end sleeve housing. The rear stem or bar of the prior linear generators are elongated as a result of kinetic force applied to push down the metal bar of the linear generator. The rear stems or bars can rest on a secondary drive bar or magnetic divider that rest on magnets of a secondary row of linear generators so applied kinetic force is transferred from the first row of linear generators to the second row of linear generators and other rows of linear generators following thereafter. A single pneumatic pressure input source will allow an array or series of linear generators to be influenced or triggered to simultaneously produce an electric current discharge or discharged electric current per spring reciprocating cycle.

A pulley system includes a pulley cord works in unison with a pulley wheel located outside the piezoelectric housing, an applied gas source working as pressure source and pneumatic pistons and piston rods to traverse opposing distal end drive bars in different directions. The left side pulley system pushes and pulls the drive bar located on the right side of the piezoelectric housing and the right side pulley system pushes and pulls the drive bar located on the left side of the piezoelectric housing. One end of the pulley cord is attached to a drive bar located at one distal end of the piezoelectric housing while the other end of the pulley cord is attached to the opposing drive bar located at the opposing end of the piezoelectric housing to facilitate a push-pull traversing motion when gas source is applied as pressure, enabling the cord to traverse around the pulley wheel to cut the volume of gas required to traverse the pistons towards a plural of linear generators in half while cutting the weight required to push down linear generators in half or more, depending on the number of pulley systems incorporated or applied.

Distal end pneumatic pistons will be positioned to work with central pneumatic pistons to traverse the drive bar back and forth. The distal end pneumatic pistons oppose the central pneumatic pistons and be adjacent to the linear generators. The number of pistons that perform pneumatic work and the number of linear generators aligned to be triggered by the ram bar that the pistons lie on is correlated. Therefore, the more pistons that are implemented, the sharper the increase in momentum and amplitude of pneumatic force to the linear generators.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A microgrid system for generating and storing energy comprising:
    an auxiliary energy source;
    a first battery coupled to the energy source;
    a gas storage tank;
    a gas compressor electrically connected to the first battery and the gas storage tank, wherein the gas compressor inputs compressed air into the gas storage tank;
    a plurality of hoses connected to the gas storage tank;
    a housing having an inner section, a first outer section, and a second outer section, the housing being connected to the plurality of hoses and including a first pneumatic piston within the housing and a second pneumatic piston within the housing and opposing the first piston, a first drive bar connected to the first piston, a second drive bar connected to the second piston, and a plurality of linear generators configured such that motion of the first piston and the second piston will cause the respective first drive bar and second drive bar to move along at least some of the plurality of linear generators, and wherein the first drive bar has a first end and a second end and the second drive bar has a third end and a forth end;
    a pulley system including a first pulley wheel with a first pulley cord, the first cord having a first end and a second end, wherein the first end is attached to the first end of the first drive bar and the second end is attached to the fourth end of the second drive bar, and including a second pulley wheel with a second pulley cord, the second pulley cord having a third end and a fourth end, wherein the third end is attached to the first end of the first drive bar and the fourth end is attached to the fourth end of the second drive bar;
    a second battery;
    and a wireless recharging transmitter and receiver,
    wherein when the compressed air from the gas storage tank is released into the inner section of the housing, the first piston and the second piston are propelled outwardly, thereby displacing the first drive bar and the second drive bar along at least some of the plurality of linear generators to produce electrical energy and when the compressed air from the gas storage chamber is released into the first outer section and the second outer section of the housing, the first piston and the second piston move inwardly, thereby displacing the first drive bar and the second drive bar along at least some of the plurality of linear generators to produce electrical energy, and wherein the pulley system is configured to reduce an amount of compressed air required to propel the first piston and second piston outwardly and required to propel the first piston and the second piston inwardly.

2. The system for storing energy of claim 1 wherein the produced electrical energy is transferred to the second battery.

3. The system for storing energy of claim 1 wherein the first battery and the second battery are connected.

4. The system for storing energy of claim 1 further including a water filtration system connected to the gas storage tank and configured to collect and filter moisture extracted from compressed air.

5. The system for storing energy of claim 1 wherein the plurality of linear generators include piezoelectric components.

6. The system for storing energy of claim 4 wherein the housing includes a plurality of sleeves for containing the piezoelectric components.

7. The system for storing energy of claim 1 wherein the system is portable.

8. The system for storing energy of claim 1 further including an adjustable release valve on the gas storage tank.

9. The system for storing energy of claim 1 further including a plurality of additional pistons.

10. The system for storing energy of claim 1 further including a dual mode switch that switches the system between an electricity mode and a water mode, wherein in the electricity mode a retractable single-direction air hose connects to a port of the gas storage tank so exhaust pressure can be recycled back into the storage tank, and wherein in the water mode an extendable single-direction air hose is retracted from an interconnecting port of the gas storage tank so exhaust pressure can exit into the atmosphere.

11. The system for storing energy of claim 1 further including a plurality of valves on the housing, wherein a subset of the plurality of valves is designed and configured to allow compressed air into the housing while the pistons are moving outwardly and to allow air to be released while the pistons are moving inwardly and wherein a second subset of the plurality of valves is designed and configured to allow compressed air into the housing while the pistons are moving inwardly and to allow air to be released while the pistons are moving outwardly.

12. A portable system for storing energy generated by renewable energy sources, the system comprising:
a gas compressor;
a gas storage tank configured to receive compressed air from the gas compressor;
a plurality of hoses connected to the gas storage tank;
a housing having an inner section, a first outer section, and a second outer section, the housing being connected to the storage tank via the plurality of hoses and including a first pneumatic piston within the housing and a second pneumatic piston within the housing and opposing the first piston, a first drive bar connected to the first piston, a second drive bar connected to the second piston, and a plurality of linear generators configured such that motion of the first piston and the second piston will cause the respective first drive bar and second drive bar to move along at least some of the plurality of linear generators, and wherein the first drive bar has a first end and a second end and the second drive bar has a third end and a fourth end; and
a pulley system including a first pulley wheel with a first pulley cord, the first cord having a first end and a second end, wherein the first end is attached to the first end of the first drive bar and the second end is attached to the fourth end of the second drive bar, and including a second pulley wheel with a second pulley cord, the second pulley cord having a third end and a fourth end, wherein the third end is attached to the first end of the first drive bar and the fourth end is attached to the fourth end of the second drive bar,
wherein when the compressed air from the gas storage tank is released into the inner section of the housing, the first piston and the second piston are propelled outwardly, thereby displacing the first drive bar and the second drive bar along at least some of the plurality of linear generators to produce electrical energy and when the compressed air from the gas storage tank is released into the first outer section and the second outer section of the housing, the first piston and the second piston move inwardly, thereby displacing the first drive bar and the second drive bar along at least some of the plurality of linear generators to produce electrical energy, and wherein the pulley system is configured to reduce an amount of compressed air required to propel the first piston and second piston outwardly and required to propel the first piston and second piston inwardly.

13. The portable system of claim 12 further including a water filtration system connected to the gas storage tank and configured to collect and filter moisture extracted from compressed air.

14. The portable system of claim 12 wherein the plurality of linear generators include piezoelectric components.

15. The portable system of claim 14 wherein the housing includes a plurality of sleeves for containing the piezoelectric components.

16. The portable system of claim 12 further including an adjustable valve on the gas storage chamber.

17. The portable system of claim 12 further including a plurality of valves on the housing, wherein a subset of the plurality of valves is designed and configured to allow compressed air into the housing while the pistons are moving outwardly and to allow air to be released while the pistons are moving inwardly.

18. A portable system for storing energy generated by renewable energy sources, the system comprising:
a gas compressor;
a gas storage tank configured to receive and store compressed air from the gas compressor;
a plurality of hoses connected to the gas storage tank; and
a housing having an inner section, a first outer section, and a second outer section, the housing being connected to the plurality of hoses and including a first pneumatic piston within the housing and a second pneumatic piston within the housing and opposing the first piston, a first drive bar connected to the first piston, a second drive bar connected to the second piston, and a plurality of linear generators configured such that motion of the first piston and the second piston will cause the respective first drive bar and second drive bar to move along at least some of the plurality of linear generators,
wherein when the compressed air from the gas storage tank is released into the inner section of the housing, the first piston and the second piston are propelled outwardly, thereby displacing the first drive bar and the second drive bar along at least some of the plurality of linear generators to produce electrical energy and when the compressed air from the gas storage tank is released into the first outer section and the second outer section of the housing, the first piston and the second piston move inwardly, thereby displacing the first drive bar and the second drive bar along at least some of the plurality of linear generators to produce electrical energy.

19. The portable system of claim 18 further including a water collection system connected to the gas storage tank and configured to collect and filter moisture extracted from compressed air.

20. The portable system of claim 18 wherein the plurality of linear generators is include piezoelectric components and a plurality of sleeves for containing the piezoelectric components.

* * * * *